UNITED STATES PATENT OFFICE.

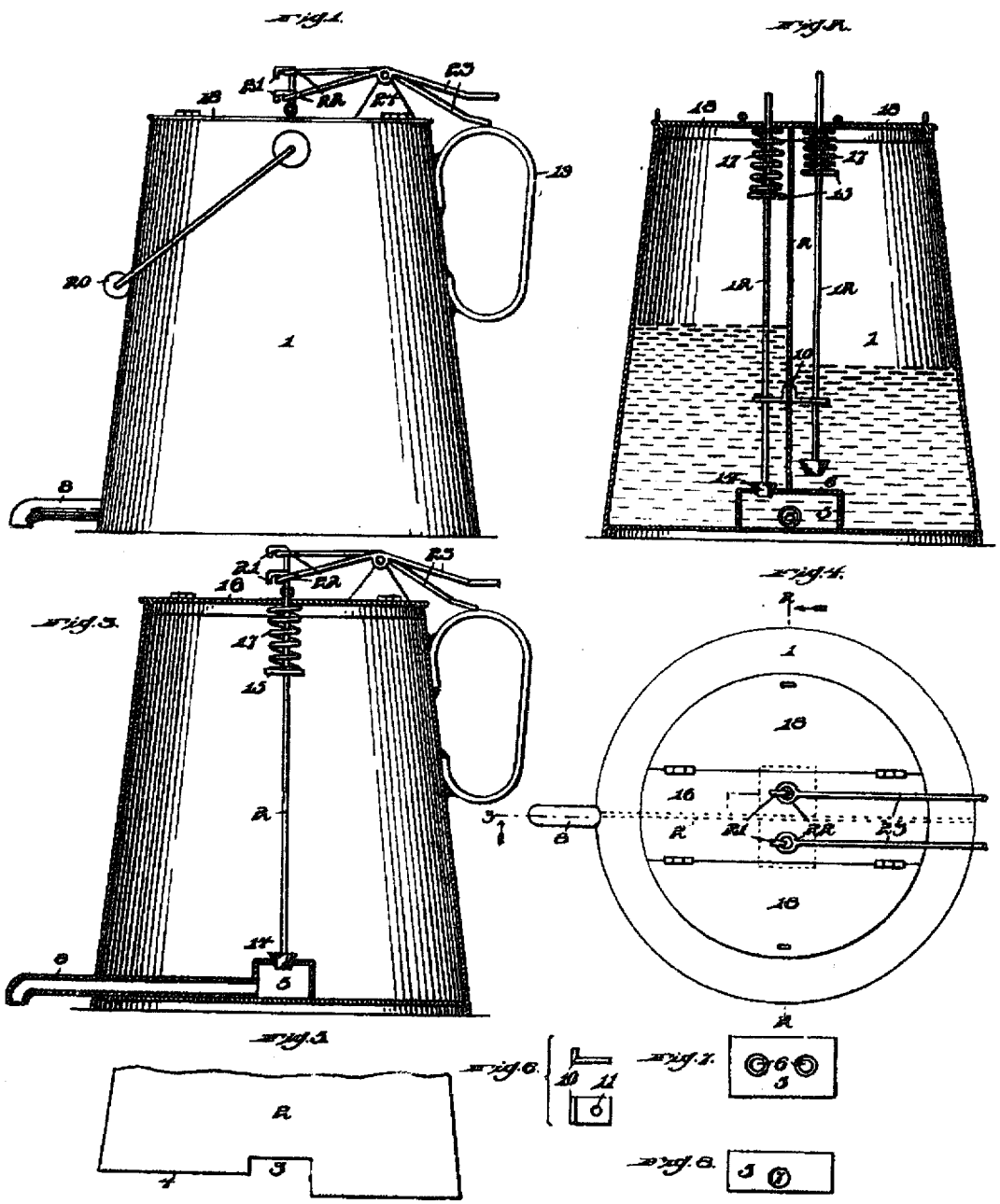

WILLIAM ROHRBACHER AND ROBERT WEDDELL, OF DUQUESNE, PENNSYLVANIA.

COMBINATION COFFEE AND TEA POT.

SPECIFICATION forming part of Letters Patent No. 695,173, dated March 11, 1902.

Application filed July 8, 1901. Serial No. 67,534. (No model.)

*To all whom it may concern:*

Be it known that we, WILLIAM ROHRBACHER and ROBERT WEDDELL, citizens of the United States of America, residing at Duquesne, in the county of Allegheny and State of Pennsylvania, have invented certain new and useful Improvements in Combination Coffee and Tea Pots, of which the following is a specification, reference being had therein to the accompanying drawings.

This invention relates to certain new and useful improvements in combination coffee and tea pots, and broadly has for its object the provision of novel means whereby both coffee and tea or chocolate and coffee may be cooked in one vessel.

Briefly described, the invention consists in a vessel having compartments with a chamber common to each, the chamber being in communication with a spout and having a port in each compartment in which operates the valves carried by rods. These rods extend to a point in proximity to the top of the vessel and are operated independently by means of levers carried by the vessel.

The invention also consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a side elevation of our improved coffee and tea pot. Fig. 2 is a vertical sectional view thereof, taken on the line 2 2 of Fig. 4 looking in the direction of the arrow. Fig. 3 is a transverse vertical sectional view of Fig. 1 of the drawings at right angles to Fig. 2. Fig. 4 is a top plan view. Fig. 5 is a plan view of the lower portion of the partition. Fig. 6 is a plan and side view of the guides arranged on the partition. Fig. 7 is a top plan view of the chamber. Fig. 8 is an end view thereof. Fig. 9 is a top plan view of one of the operating-handles.

In the drawings the reference-numeral 1 indicates the body portion of the vessel, and 2 represents a central partition, having an opening 3 formed therein and a cut-away portion 4.

The reference-numeral 5 represents a chamber arranged on the bottom of the vessel and secured in the recessed portion 3 of the partition.

The reference-numerals 6 6 represent openings arranged in the upper portion of the chamber on each side of the partition.

7 represents an opening formed in the side of the chamber, communicating with the spout 8, secured on the bottom of the vessel, and extending through the same.

The reference-numeral 10 represents lugs secured on each side of the partition, having formed therein apertures 11 for the reception of the operating-rods 12 12. These rods carry on their lower ends valves 14, which open and close the opening 6 of the chamber. These rods also carry washers 15, having interposed between the upper face of said washers and the cross-piece 16 of the vessel springs 17. To said cross-piece 16 are secured hinged lids or covers 18 for each compartment of the vessel.

The reference-numeral 19 represents a handle rigidly secured to the side of the vessel, and 20 represents a bail. The operating-rods 12 extend through openings formed in the cross-piece 16 of the vessel and are bent over, forming hooked portions 21. These hooked portions engage in eyes 22, formed on the operating-levers 23, which are pivotally mounted upon bearings 24, rigidly secured to the cross-piece 16 of the vessel.

The operation of our improved coffee and tea pot is as follows: Normally both valves are closed, and when it is desired to extract coffee from the can one of the operating-levers 24, extending into the compartments of the can containing the coffee, is operated by depressing the end of the operating-lever, thereby raising the operating-rod, opening the valve in the chamber, and allowing the coffee to flow into said chamber through the spout, as will be readily understood. As the operating-lever is released the spring 17 will again return the lever to its normal position and automatically close the valve by the expansion of the spring 17.

It will be seen that the chamber, as well as the spout, is arranged at the bottom of the can in order to drain the coffee or tea, as the case may be, that when the change is made from one to the other that all the coffee or tea in the chamber and spout will be drained therefrom.

The many advantages obtained by the use of our improved device will be readily apparent from the foregoing description, taken in connection with the accompanying drawings.

It will be noted that various changes may be made in the details of construction without departing from the general spirit of our invention.

Having fully described our invention, what we claim as new, and desire to secure by Letters Patent, is—

1. In a device of the character described, a vessel having a partition therein, a chamber carried by the bottom of the said vessel and extending on each side of said partition, a spout communicating with said chamber, ports in said chamber, valves in said ports, spring-pressed operating-rods connected to said valves, and means carried by the cover for operating said rods independently, substantially as described.

2. In a device of the character described, a vessel having a partition therein, a chamber carried by the bottom of said vessel, ports in said chamber located one on each side of said partition, a spout communicating with said chamber, spring-pressed rods carrying valves, said valves operating in said ports, the upper ends of said rods extending above the top of the vessel, bearings carried by the vessel, and operating-levers connected to the said ends of the rods, substantially as described.

3. In a vessel having compartments therein with a chamber common to each, the chamber being in communication with a spout and having a port in each compartment, rods carrying valves extending to a point in proximity to the top and being independently operated by levers carried by the vessel, substantially as described.

In testimony whereof we affix our signatures in the presence of two witnesses.

WILLIAM ROHRBACHER.
ROBERT WEDDELL.

Witnesses:
JOHN NOLAND,
E. E. POTTER.